United States Patent
Goyal et al.

(10) Patent No.: US 9,892,204 B2
(45) Date of Patent: *Feb. 13, 2018

(54) CREATING OPTIMIZED SHORTCUTS

(71) Applicant: International Business Machines Corporation, Armonk, NY (US)

(72) Inventors: Amit Goyal, Pune (IN); Prasad P. Purandare, Pune (IN); Paryushan P. Sarsamkar, Pune (IN); Arti Singh, Uttar Pradesh (IN)

(73) Assignee: International Business Machines Corporation, Armonk, NY (US)

( * ) Notice: Subject to any disclaimer, the term of this patent is extended or adjusted under 35 U.S.C. 154(b) by 126 days.

This patent is subject to a terminal disclaimer.

(21) Appl. No.: 14/536,834

(22) Filed: Nov. 10, 2014

(65) Prior Publication Data

US 2016/0132514 A1 May 12, 2016

(51) Int. Cl.

| | |
|---|---|
| *G06F 17/30* | (2006.01) |
| *G06F 3/0482* | (2013.01) |
| *G06F 3/0484* | (2013.01) |
| *H04L 29/08* | (2006.01) |
| *G06F 17/22* | (2006.01) |
| *G06F 17/27* | (2006.01) |

(52) U.S. Cl.
CPC ........ *G06F 17/3089* (2013.01); *G06F 3/0482* (2013.01); *G06F 3/04842* (2013.01); *G06F 17/2247* (2013.01); *G06F 17/276* (2013.01); *G06F 17/30011* (2013.01); *G06F 17/30884* (2013.01); *H04L 67/02* (2013.01)

(58) Field of Classification Search
CPC ............... G06F 3/0482; G06F 3/04842; G06F 17/30884

USPC ......................................................... 715/827

See application file for complete search history.

(56) References Cited

U.S. PATENT DOCUMENTS

| | | | |
|---|---|---|---|
| 7,552,400 B1 | 6/2009 | Sriver et al. | |
| 8,136,047 B2 | 3/2012 | Holecek et al. | |
| 9,201,585 B1 | 12/2015 | Karakotsios et al. | |
| 2007/0288561 A1* | 12/2007 | Beckhusen | G06Q 10/107 709/204 |
| 2009/0327947 A1 | 12/2009 | Schreiner et al. | |
| 2011/0131523 A1 | 6/2011 | Grant et al. | |
| 2013/0132856 A1 | 5/2013 | Binyamin et al. | |
| 2013/0262188 A1* | 10/2013 | Leibner | G06Q 50/01 705/7.36 |
| 2015/0077326 A1 | 3/2015 | Kramer et al. | |

FOREIGN PATENT DOCUMENTS

| | | |
|---|---|---|
| WO | 9858321 A1 | 12/1998 |
| WO | 2007085952 A1 | 8/2007 |

OTHER PUBLICATIONS

IBM: List of IBM Patents or Patent Applications Treated As Related (Appendix P), dated May 20, 2015.
U.S. Pending U.S. Appl. No. 14/716,930, filed May 20, 2015, entitled "Creating Optimized Shortcuts", pp. 1-26.

* cited by examiner

*Primary Examiner* — Andrea Leggett
(74) *Attorney, Agent, or Firm* — Michael O'Keefe (57) ABSTRACT

An approach for using shortcut input to access or group documents is provided. The input may be mapped to opening or grouping the documents based on user preferences, and the documents may be displayed once the computer system detects the input of the shortcut input.

13 Claims, 5 Drawing Sheets

CREATING OPTIMIZED SHORTCUTS

BACKGROUND

The present invention relates to manipulation of graphical user interfaces, and more particularly to the use of shortcuts to manipulate graphical user interfaces.

A graphical user interface (GUI) is a type of interface that allows users to interact with electronic devices through graphical icons and visual indicators. The actions in a GUI are usually performed through direct manipulation of the graphical elements. GUIs may be used in operating computers, phones, tablets, aming systems, handheld devices, etc.

As a supplement to the GUI system, shortcut commands may allow a user to perform a desired task with a single input, or combination of inputs, that are performed simultaneously, without the need to maneuver through multiple menus or screens on the GUI interface. In general shortcuts exist across many platforms, such as, for example computers (e.g. ctrl+c to copy text), and smart phones and tablets (e.g. pressing 2 fingers on the screen and moving them apart to zoom).

BRIEF SUMMARY

An embodiment of the invention may include a method for operating a computing device using shortcuts. The method may include a computing device that receives user preferences detailing a shortcut input. The computing device may map the shortcut input to one or more documents, based on user preference. The computing device may then detect that the shortcut input has been utilized, and then may display the one or more documents associated with that input.

Another embodiment of the invention provides a computer program product for operating a computing device using shortcuts to receive user preferences, where computer instructions receive user preferences detailing a shortcut input; map the shortcut input to one or more documents, based on user preference; detect that the shortcut input has been utilized, and then may display the one or more documents associated with that input.

Another embodiment of the invention provides a computer system for operating a computing device using shortcuts to receive user preferences, where computer instructions receive user preferences detailing a shortcut input; map the shortcut input to one or more documents, based on user preference; detect that the shortcut input has been utilized, and then may display the one or more documents associated with that input.

Elements of the figures are not necessarily to scale and are not intended to portray specific parameters of the invention. For clarity and ease of illustration, dimensions of elements may be exaggerated. The detailed description should be consulted for accurate dimensions. The drawings are intended to depict only typical embodiments of the invention, and therefore should not be considered as limiting the scope of the invention. In the drawings, like numbering represents like elements.

DETAILED DESCRIPTION

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention will now be described in detail with reference to the accompanying Figures.

Figure 1:
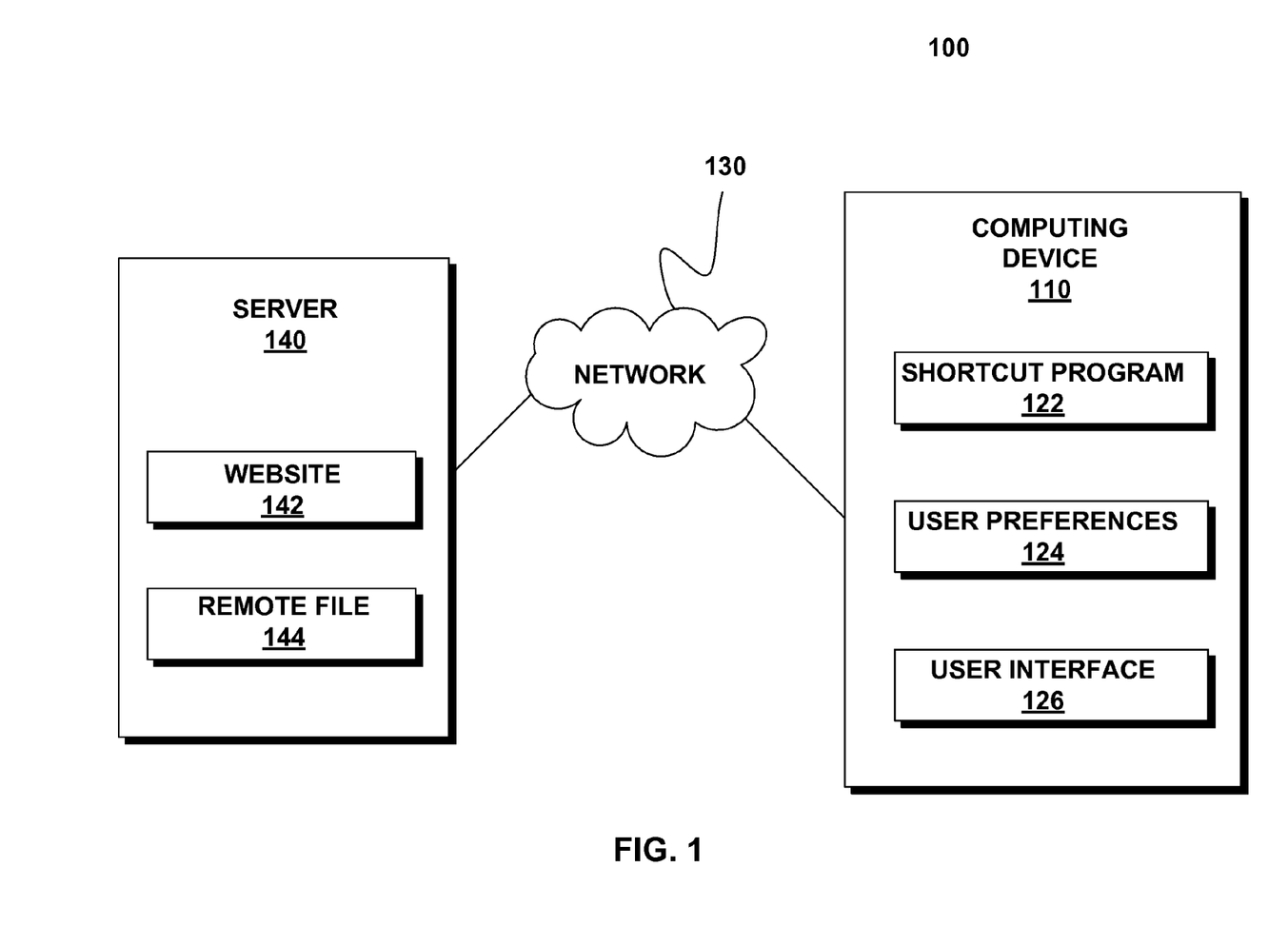
FIG. 1 illustrates a shortcut system, in accordance with an embodiment of the invention.

FIG. 1 illustrates shortcut system 100, in accordance with an embodiment of the invention. In an example embodiment, shortcut system 100 includes a computing device 110 and a server 140 interconnected via a network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a local area network (LAN), or a wide area network (WAN). In general, network 130 can be any combination of connections and protocols that will support communications between the computing device 110 and the server 140.

Figure 3:
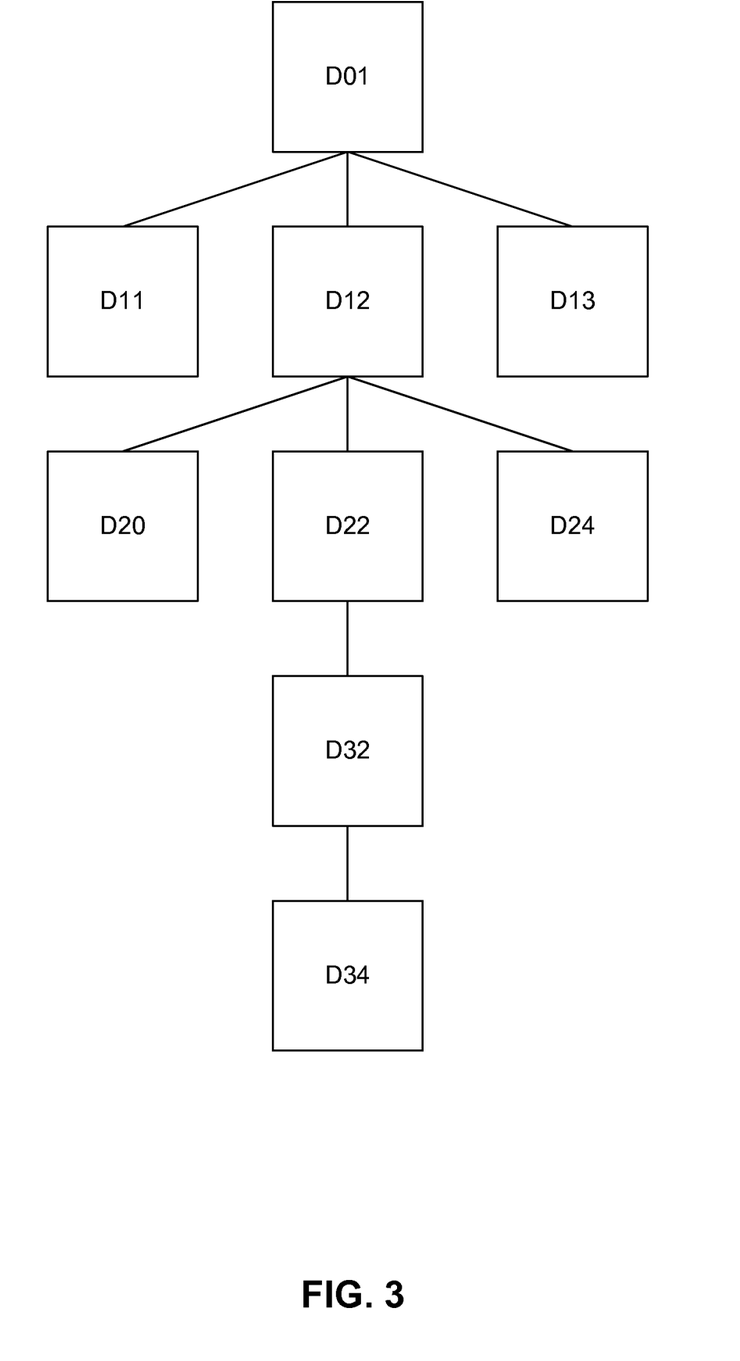
FIG. 3 is a block diagram depicting the hardware components of the shortcut system of FIG. 1, in accordance with an embodiment of the invention.

Server 140 may include a website 142 and/or a remote file 144. Server 140 may be a desktop computer, a notebook, a laptop computer, a tablet computer, a handheld device, a smart-phone, a thin client, or any other electronic device or computing system capable of receiving and sending data to and from other computing devices such as computing device 110 via network 130. Although not shown, optionally, server 140 can comprise a cluster of web servers executing the same software to collectively process the requests for the web pages as distributed by a front end server and a load balancer. In an example embodiment, server 140 is a computing device that is optimized for the support of websites which reside on server 140, such as website 142, and for the support of network requests related to websites which reside on server 140. Server 140 is described in more detail with reference to FIG. 3.

Website 142 is a collection of files including, but not limited to, for example, HTML files, CSS files, XML files, image files and JavaScript files. Website 142 can also include other resources such as audio files and video files. Remote file 144 is a document located on server 140 that can only be accessed through using a network 130. Remote file 144 may be, for example, a word processing document, an email, an excel spreadsheet, etc.

Computing device 110 includes shortcut program 122, user preferences 124 and user interface 126. In the example embodiment, computing device 110 is a desktop computer, a notebook or a laptop computer; however, in other embodiments, computing device 110 may be a smart phone, a tablet computer, a handheld device, a thin client, or any other electronic device or computing system capable of receiving and sending data to and from server 140 via network 130, and capable of operating a graphical user interface. Computing device 110 is described in more detail with reference to FIG. 3.

Figure 2A:
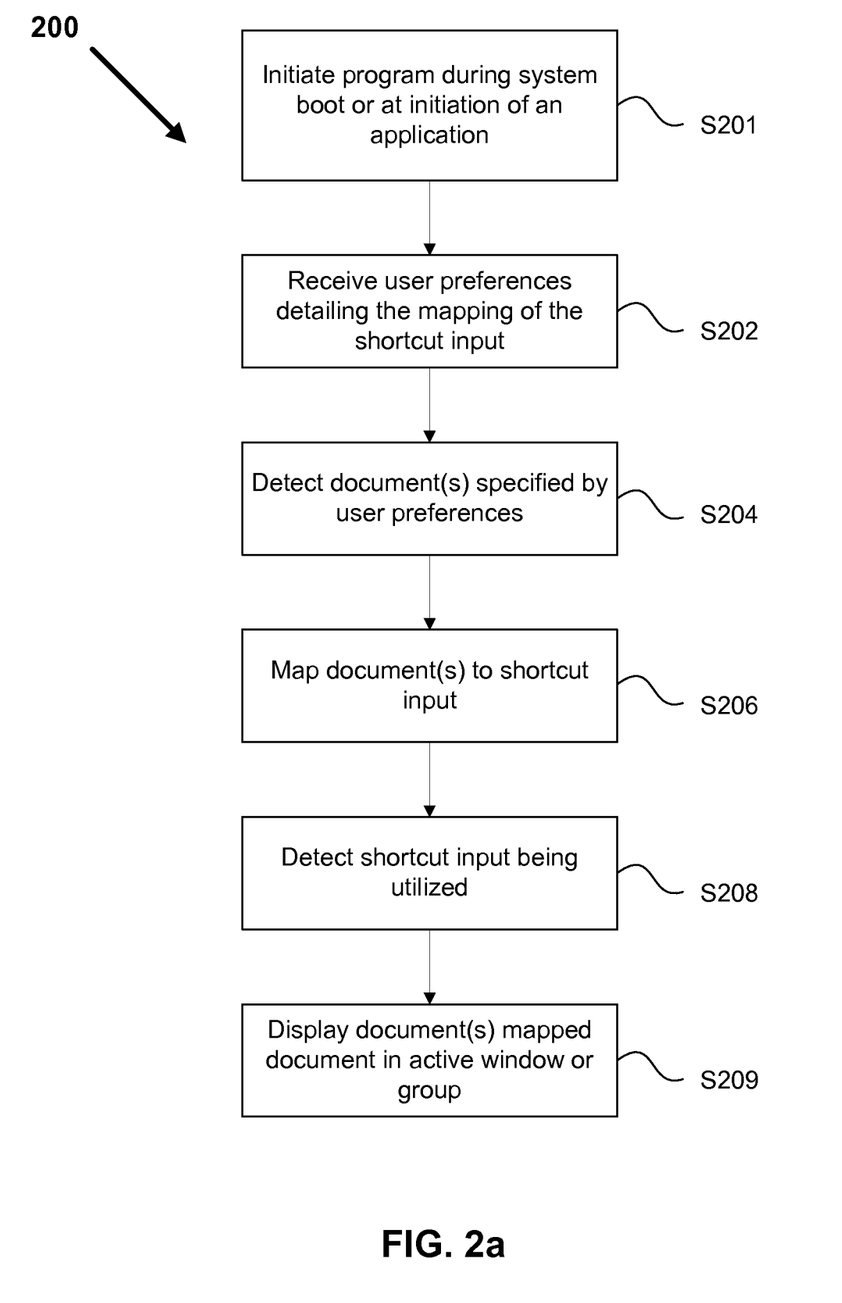
FIG. 2a is a flowchart illustrating the operations of the shortcut program of FIG. 1 in determining what document to display based on a shortcut input, in accordance with an embodiment of the invention.
Figure 2B:
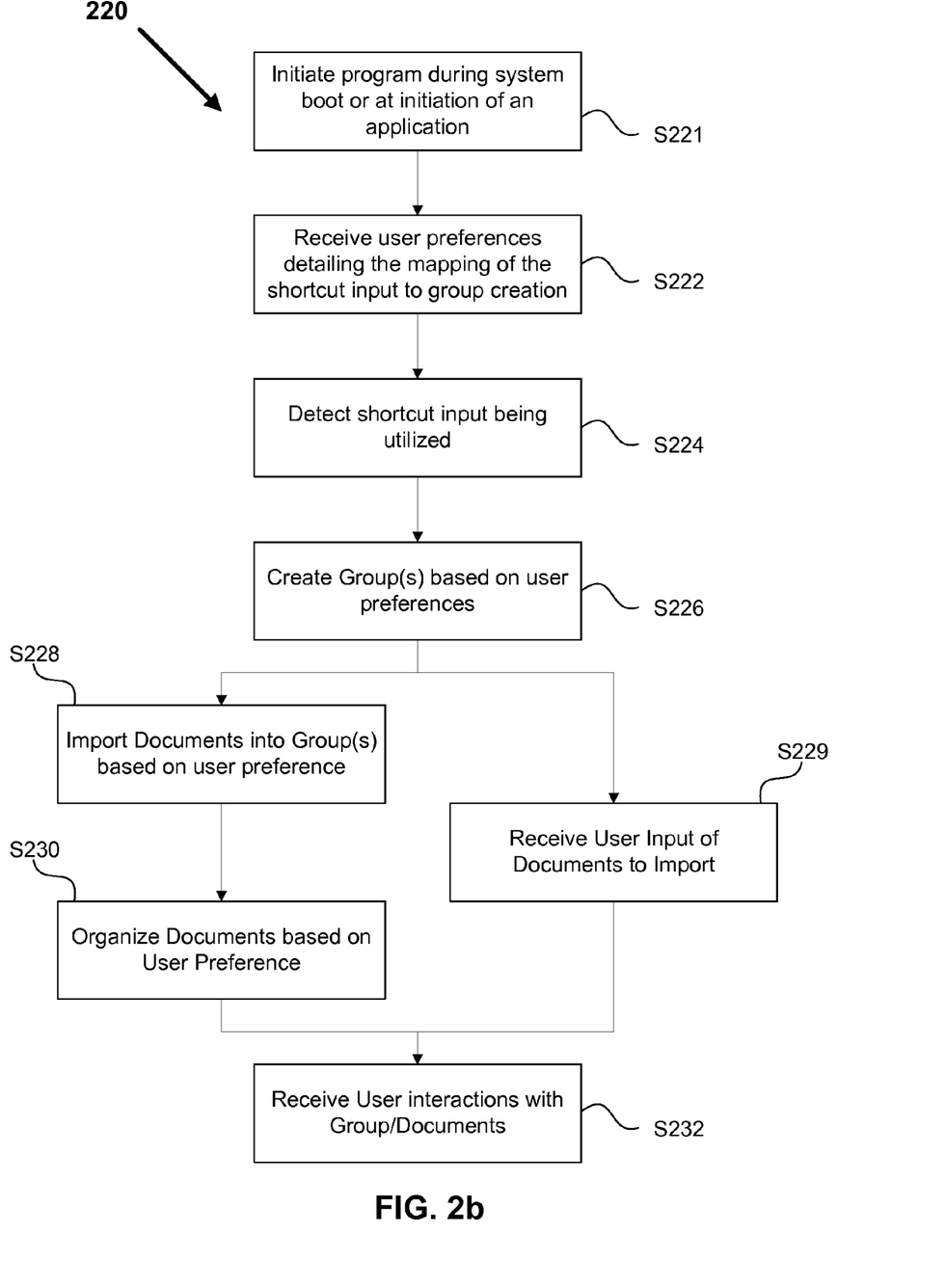
FIG. 2b is a flowchart illustrating the operations of the shortcut program of FIG. 1 in determining what documents to group based on a shortcut input, in accordance with an embodiment of the invention.

In the example embodiment, user preferences 124 may contain information that details preferred shortcut inputs of the user of computing device 110. In the example embodiment, user preferences 124 may also include favorite programs or websites, or desired actions to be taken. User preferences 124 are described in further detail below with regard to FIG. 2.

User interface 126 includes components used to receive input from a user and transmit the input to an application residing on computing device 110. In an example embodiment, user interface 126 uses a combination of technologies and devices, such as device drivers, to provide a platform to enable users of computing device 110 to interact with shortcut program 122. In the example embodiment, user interface 126 receives input, such as textual input received from a physical input device, such as a keyboard, via a device driver that corresponds to the physical input device.

Shortcut program 122 is a software application or configuration in a software application capable of receiving user preferences from a user of computing device 110 via user interface 126. In addition, shortcut program 122 is capable of mapping a shortcut input to one or more documents based on user preferences 124. Shortcut program 122 may also be capable of grouping of one or more documents based on user preferences 124. The operations and functions of shortcut program 122 are described in further detail below with regard to FIG. 2.

FIG. 2a is a flow chart illustrating a first method 200 of the operation of shortcut program 122 in mapping a shortcut input to one or more documents based on user preferences 124, in accordance with an example embodiment of the invention. In an example embodiment, the shortcut program 122 is initiated when the operating system is booted (S201). In a separate embodiment the shortcut program 122 may be fully or partially integrated with a specific application, or applications, and therefore is initiated when the specific application is initiated (S201). In such an embodiment, opening of an application may include opening of a web browser, an explorer window, a word processing document, an e-mail client, a spreadsheet, a database application, or any other type of electronic interface.

In the example embodiment, shortcut program 122 receives user preferences 124, by way of inputs from the user of computing device 110 via user interface 126 (S202). In another embodiment, default preferences may be stored as user preferences 124. In the example embodiment, the user preferences include defined shortcut inputs. A shortcut input is a single action that may be utilized by a user to access a document or several documents without the need for multiple inputs (e.g. multiple mouse clicks/movements to perform a desired action). For example, a shortcut input may include a shortcut keystroke (e.g. ctrl+r) on a computer keyboard, a shortcut gesture on a multi-touch screen (e.g. spiral finger swipe), a shortcut movement into a visual sensor (e.g. winking at a camera on a device), an audio command into an audio sensor (e.g. speaking into a microphone), or any other type of single input into a computer.

In the example embodiment, the user preferences also include desired results that correspond to each shortcut input. The desired result to be performed by the shortcut input may be, for example, opening a document or a number of documents (e.g. last 10 documents opened, 5 documents created by a certain user, all documents located in a certain file location). In other embodiments, the desired result may be to return the user back to a root document or document group within an application being utilized by a user of computing device 110.

In an example embodiment, shortcut program 122 detects the document(s) specified in user preferences 124 (S204) and maps the location of the document(s) to a shortcut input (S206). For example, the shortcut program 122 may map with the opening of the 10 favorite webpages of the user to the shortcut input (e.g. ctrl+shift+o), so that when the user presses the button combination, the 10 favorite webpages of the user of computing device 110 are opened. In this example, the URL of the 10 favorite webpages may be stored in user preferences 124. In a separate embodiment of this example, the shortcut program 122 may communicate with a web browser to determine the stored favorite webpages, the 10 most visited webpages, or any other relevant criterion based on the user preferences 124.

In an example embodiment, shortcut program 122 detects the shortcut input being utilized (S208). This may be accomplished by the shortcut program 122 communicating with the operating system to determine that the shortcut input has been utilized.

In an exemplary embodiment, shortcut program 122 displays or opens the mapped document(s) in an active window (S209). The user may then browse, or edit, the opened documents in the appropriate programs.

In another embodiment, the shortcut program 122 may return the user of computing device 110 to a parent folder or document from a sub-folder or document that the user navigated to in the document tree, where the user is returned to a folder or document previously in the document branch. In an example scenario of a document tree illustrated by FIG. 3, an email document D01 is opened. The e-mail document D01, has a spreadsheet D11, a word processing document D12, and a database document D13, all of which are opened. The word processing document D12 contains multiple hyperlinks, and a first webpage D20, a second webpage D22 and a third webpage D24 are opened from the word processing document. From the second webpage D22, a user navigates to a first linked webpage D32, and from the first linked webpage D32 to a second linked webpage D34. With the second linked webpage D34 as the active location, in an example embodiment where the user wishes to return to the root document of the document branch, the desired result from using a shortcut input would be to open the email document D01 in the active window. In another embodiment where the user wishes to return to the original document in the program being operated, the desired result from using a shortcut input would be to open the second webpage D22 in the document branch.

FIG. 2b is a flow chart illustrating a second method 220 of the operations of shortcut program 122 in mapping a shortcut input to the grouping of, and possible organization, of open documents in accordance with an example embodiment of the invention. In an example embodiment, the program is initiated when the operating system is booted (S221). In a separate embodiment the shortcut program 122 may be fully or partially integrated with a specific application, or applications, and therefore is initiated when the specific application is initiated. In such an embodiments, initiating an application may include opening of a web browser, an explorer window, a word processing document, an e-mail client, a spreadsheet, a database application, or any other type of electronic interface.

In an example embodiment, shortcut program 122 receives user preferences 124, by way of inputs from the user of computing device 110 via user interface 126 and maps the grouping of documents to a shortcut input (S222). In another embodiment, default preferences may be stored as user preferences 124. In the example embodiment, the user preferences include defined shortcut inputs. A shortcut input is a single action that may be utilized by a user to access a document or several documents without the need for multiple inputs (e.g. multiple mouse clicks/movements to perform a desired action). For example, a shortcut input may include a shortcut keystroke (e.g. ctrl+r) on a computer keyboard, a shortcut gesture on a multi-touch screen (e.g. spiral finger swipe), a shortcut movement into a visual sensor (e.g. winking at a camera on a device), an audio command into an audio sensor (e.g. speaking into a microphone), or any other type of single input into a computer.

The user preferences may also include desired results that may correspond to each shortcut input. In an example embodiment, the desired result may be grouping all of the opened documents based on user defined criterion, such as, for example, document type, document location, date of creation of document (e.g. by day, week, month, year), originator of the document, etc. In another embodiment, the desired result to be performed by the shortcut input may be, for example, creating a virtual group to organize documents. A virtual group may be a temporary group which the user can create and modify during a particular session. For example, the user may group various documents with a hard to define criterion (e.g. documents related to a type of Patent Office rejeciton) as part of a single group.

Once the user preferences have been received, the shortcut program maps the shortcut input to the desired result. For example, the shortcut program 122 may map the grouping of e-mail documents by sender to the user pressing a combination of buttons (e.g. ctrl+shift+s), so that when the user presses the button combination the e-mails are placed in folders, or tabs, based on the sender of the e-mail document.

In an example embodiment, shortcut program 122 detects the shortcut input being utilized (S224), and creates a group or groups based on the user preferences (S226). The group may be a virtual group that allows a user to manually define the documents associated, or a group or multiple groups that may organize documents displayed on the user display 128.

In an example embodiment of the second shortcut method 220, shortcut program 122 may import documents into a group or multiple groups based on the user preferences (S228). In an example embodiment, the shortcut program 122 may organize a set of opened email documents based on the sender, the date it was sent, file names associated with the email document, document importance, etc.

In the example embodiment of the second shortcut method 220, shortcut program 122 may organize documents based on user preferences (S230). In such an embodiment, user preferences may sort the documents based on, for example, the date of creation of the document. In this example embodiment, each document in the group may be associated with a number, which may be used with a shortcut input from the user preferences that may allow for selection of a desired document when the group is open.

In another embodiment of the second shortcut method 220, shortcut program 122 may receive user input to import and organize documents in a virtual group (S229). In this embodiment, the shortcut program may allow the user to input the documents into the group by, for example, using a mouse to drag the desired document into the desired folder. This may allow a user to manually manipulate documents that do not have an easily recognizable criterion.

In an example embodiment, shortcut program 122 may receive user input to manually organize or manipulate documents, groups of documents (S232). For example, the user may select a group and close all documents in the selected group.

Figure 4:
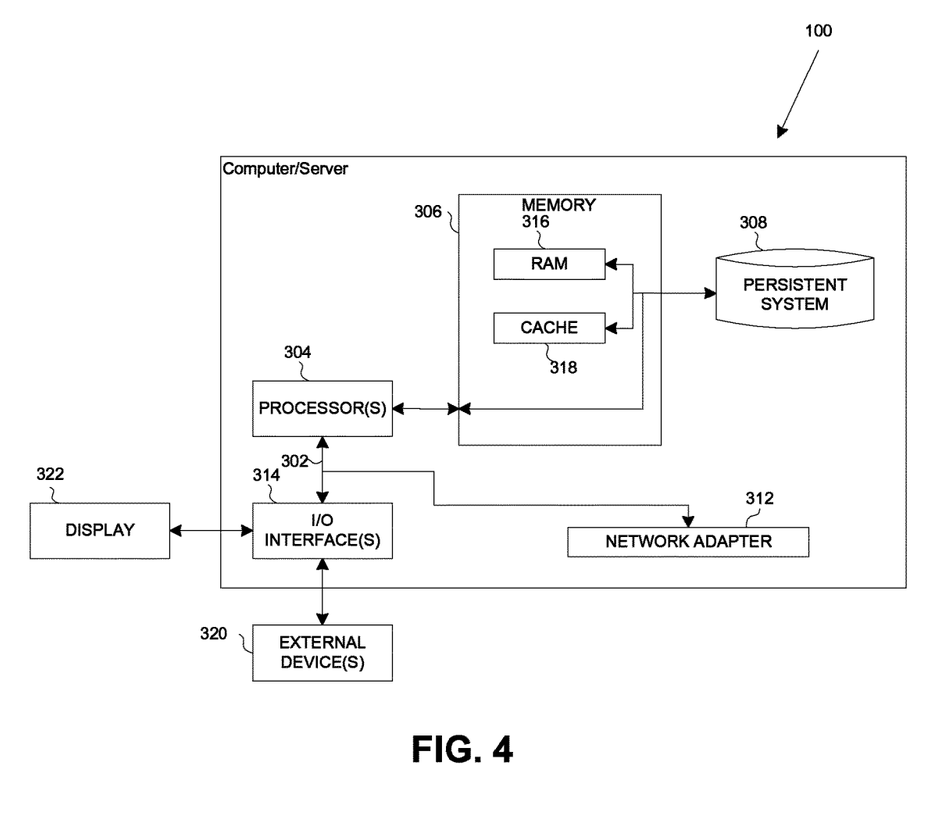
FIG. 4 is a diagram depicting the document from which subsequent documents were opened from, in accordance with an embodiment of the invention.

FIG. 4 depicts a block diagram of components of computing device 110 and server 140, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and server 140 include communications fabric 302, which provides communications between computer processor(s) 304, memory 306, persistent storage 308, communications unit 312, and input/output (I/O) interface(s) 314. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 316 and cache memory 318. In general, memory 306 can include any suitable volatile or non-volatile computer-readable storage media.

The programs delay program 122, user preferences 124, user interface 126, and user display 128 in computing device 110; and website 142 and stored files 144 in server 140 are stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 312, in these examples, provides for communications with other data processing systems or devices. In these examples, communications unit 312 includes one or more network interface cards. Communications unit 312 may provide communications through the use of either or both physical and wireless communications links. The programs delay program 122, user preferences 124, user interface 126, and user display 128 in computing device 110; and website 142 and stored files 144 in server 140 may be downloaded to persistent storage 308 through communications unit 312.

I/O interface(s) 314 allows for input and output of data with other devices that may be connected to computing device 110 and social media server 140. For example, I/O interface 314 may provide a connection to external devices 320 such as a keyboard, keypad, a touch screen, and/or some other suitable input device. External devices 320 can also include portable computer-readable storage media such as, for example, thumb drives, portable optical or magnetic disks, and memory cards. Software and data used to practice embodiments of the present invention, e.g., The programs delay program 122, user preferences 124, user interface 126, and user display 128 in computing device 110; and website 142 and stored files 144 in server 140, can be stored on such portable computer-readable storage media and can be loaded onto persistent storage 308 via I/O interface(s) 314. I/O interface(s) 314 can also connect to a display 322.

Display 322 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A computer program product for operating a computer using shortcuts, the computer program product comprising:
one or more computer-readable storage devices and program instructions stored on at least one of the one or more tangible storage devices, the program instructions comprising:
program instructions to receive user preferences including information detailing a first shortcut input, wherein the first shortcut input is a single action utilized by a user;
program instructions to map the first shortcut input to one or more documents based on the received user preferences;
program instructions to detect that the first shortcut input has been utilized; and
program instructions to display the one or more documents.

2. The computer program product of claim 1, further comprising responsive to detecting that the first shortcut input has been utilized, the program instructions creates a group comprising the one or more documents.

3. The computer program product of claim 2, wherein the program instructions maps the first shortcut input to one or more documents based on the received user preferences further comprises detection of opening of the one or more documents.

4. The computer program product of claim 1, wherein the program instructions creates the group based on similarities between the multiple documents.

5. The computer program product of claim 4, wherein the one or more documents within the group are organized based on the received user preferences, and each of the one or more documents within the group are mapped to a corresponding second shortcut input within a plurality of second shortcut inputs.

6. The computer program product of claim 1, wherein the received user preferences further include information detailing the mapping of the first shortcut input to an earlier opened document in a document branch of a document tree.

7. The computer program product of claim 1, wherein the received user preferences further include information detailing the program instructions map the first shortcut input to a list of documents selected by the user.

8. A computer system for operating a computer using shortcuts, the computer system comprising:
one or more processors, one or more computer-readable memories, one or more computer-readable tangible storage devices, and program instructions stored on at least one of the one or more storage devices for execution by at least one of the one or more processors via at least one of the one or more memories, the program instructions comprising:
program instructions to receive user preferences including information detailing a first shortcut input, wherein the first shortcut input is a single action utilized by a user;
program instructions to map the first shortcut input to one or more documents based on the received user preferences;
program instructions to detect that the first shortcut input has been utilized; and
program instructions to display the one or more documents.

9. The computer system of claim 8, further comprising responsive to detecting that the first shortcut input has been utilized, the program instructions creates a group comprising the one or more documents.

10. The computer system of claim 8, wherein the program instructions creates the group based on similarities between the multiple documents.

11. The computer system of claim 10, wherein the one or more documents within the group are organized based on the received user preferences, and each of the one or more documents within the group are mapped to a corresponding second shortcut input within a plurality of second shortcut inputs.

12. The computer system of claim 8, wherein the received user preferences further include information detailing the mapping of the first shortcut input to an earlier opened document in a document branch of a document tree.

13. The computer system of claim 8, wherein the received user preferences further include information that the program instructions map the first shortcut input to a list of documents selected by the user.

* * * * *